US012752937B2

(12) United States Patent
Thornton et al.

(10) Patent No.: US 12,752,937 B2
(45) Date of Patent: Oct. 6, 2026

(54) LUNAR POWER GRID ASSEMBLY

(71) Applicant: Astrobotic Technology, Inc., Pittsburgh, PA (US)

(72) Inventors: John Thornton, Pittsburgh, PA (US); Daniel Hendrickson, Pittsburgh, PA (US); Thomas Oberst, Wexford, PA (US)

(73) Assignee: Voyager Technologies, Inc., Denver, CO (US)

( * ) Notice: Subject to any disclaimer, the term of this patent is extended or adjusted under 35 U.S.C. 154(b) by 116 days.

(21) Appl. No.: 18/568,794

(22) PCT Filed: Jun. 10, 2022

(86) PCT No.: PCT/US2022/032988
§ 371 (c)(1),
(2) Date: Dec. 8, 2023

(87) PCT Pub. No.: WO2022/261423
PCT Pub. Date: Dec. 15, 2022

(65) Prior Publication Data

US 2024/0270411 A1 Aug. 15, 2024

Related U.S. Application Data

(60) Provisional application No. 63/209,664, filed on Jun. 11, 2021.

(51) Int. Cl.
*H02S 20/30* (2014.01)
*B64G 1/10* (2006.01)
(Continued)

(52) U.S. Cl.
CPC ........... *B64G 1/443* (2013.01); *B64G 1/1071* (2023.08); *B64G 1/16* (2013.01); *B64G 1/62* (2013.01); *B64G 1/625* (2023.08); *H02S 20/30* (2014.12)

(58) Field of Classification Search
CPC ................................ B64G 1/443; H02S 20/30
See application file for complete search history.

(56) References Cited

U.S. PATENT DOCUMENTS 5,019,768 A * 5/1991 Criswell ................ H01Q 1/248
343/912
9,090,315 B1 * 7/2015 Stone .................... E21B 47/135
(Continued)

FOREIGN PATENT DOCUMENTS

WO 20200033561 A2 2/2020
WO 20200033561 A3 2/2020

OTHER PUBLICATIONS

Pappa et al., Relocatable 10 kW Solar Array for Lunar South Pole Missions, NASA/TM-20210011743, pp. 1-14, Mar. 2021.*
Nishida et al., A mobility System for Lunar Rough Terrain, ICROS-SICE International Joint Conference, Fukuoka International Congress Center, Japan, pp. 4716-4721 (Year: 2009).*
(Continued)

*Primary Examiner* — Jayne L Mershon
(74) *Attorney, Agent, or Firm* — FisherBroyles, LLP; Cara L. Crowley-Weber; Gregory T. Fettig

(57) ABSTRACT

A pair of interconnected vertical solar arrays at two preselected lunar sites are provided. A cable transmits power between one of the vertical solar arrays and the other vertical solar array, so that one of the vertical solar arrays can send collected energy to other vertical solar array, when the other vertical solar array is not collecting energy, to maintain the temperature of the other vertical solar array. A power storage device receives solar energy from the vertical solar arrays. A charging interface distributes energy to one or more lunar devices on the lunar surface. A landing vehicle has a payload thereon for carrying at least one of the pair of interconnected vertical solar arrays, the cable, the power storage device, and the charging interface.

14 Claims, 5 Drawing Sheets

(51) Int. Cl.

| | |
|---|---|
| ***B64G 1/16*** | (2006.01) |
| ***B64G 1/44*** | (2006.01) |
| ***B64G 1/62*** | (2006.01) |

(56) References Cited

U.S. PATENT DOCUMENTS

| | | | | | |
|---|---|---|---|---|---|
| 10,989,443 | B1 * | 4/2021 | Sercel | .................... | H10F 77/488 |
| 2021/0013830 | A1 * | 1/2021 | Francis | .................... | H02S 30/20 |
| 2021/0380007 | A1 * | 12/2021 | Merritt | ...................... | B60G 3/20 |
| 2022/0135257 | A1 * | 5/2022 | Zhang | ..................... | B64G 1/417<br>244/171.1 |
| 2024/0278981 | A1 * | 8/2024 | Song | ........................ | B60L 53/53 |

OTHER PUBLICATIONS

International Search Report and Written Opinion for Application No. PCT/US2022/032988 , mailed on Sep. 9, 2022, 9 pages.

"NASA, Industry to Mature Vertical Solar Array Technologies for Lunar Surface," (Smith) Mar. 23, 2021 retrieved from URL: https://www.nasa.gov/feature/nasa-industry-to-mature-vertical-solar-array-technologies-for-lunar-surface, entire document, 3 pages.

Search Report for European Patent Application No. 22821100.9 dated Mar. 28, 2025.

Takeshi Hoshinoa et al., :Lunar polar exploration mission for water prospection—JAXA's current status of joint study with ISRO, Acta Astronautica 176 (2020) 52-58.

Shin-Ichiro Nishida et al., A Mobility System for Lunar Rough Terrain,ICROS-SICE International Joint Conference 2009, Aug. 18-21, 2009, Fukuoka International Congress Center, Japan.

* cited by examiner

LUNAR POWER GRID ASSEMBLY

CROSS REFERENCE TO RELATED APPLICATION

The present application is a U.S. national stage application of PCT International Application No. PCT/US2022/032988, filed Jun. 10, 2022, and published as PCT Publication WO/2022/261423 on Dec. 15, 2022, which claims priority to U.S. Patent Application No. 63/209,664, filed on Jun. 11, 2021. The disclosures of all the foregoing applications are hereby incorporated by reference in their entirety into the present application.

TECHNICAL FIELD

The subject disclosure is directed to systems, methods, and apparatus for establishing a lunar power grid.

BACKGROUND ART

All of our collective ambitions on the Moon hinge on the establishment of continuous, reliable, electrical power. Astronaut habitats, in-situ resource utilization pilot plants, long duration rover mobility, and commercial business plans all require substantial, uninterrupted power. The demand for power comes not just from surface operations, but the need to survive beyond the untenably short lunar day.

Previously used, conventional lunar power generation systems were developed for each mission. The operation of the systems, as well as the maintenance had to be determined well in advance. These custom designed systems added significant cost and complexity to those missions. Moreover, the power that was provided through those systems was temporary and limited.

Most proposed lunar power solutions for future missions require significant technology development and utilize systems that have low technology readiness levels. For example, power beaming has yet to be deployed and relied upon in space. Nuclear fission power systems for the Moon are still in the early design phases, and will require significant policy developments before they can be deployed and operated by the private sector. Accordingly, there is a need for an improved lunar power system that does not have any of the drawbacks of the conventional lunar power or the proposed lunar power systems.

DISCLOSURE OF INVENTION

In various implementations, a lunar power grid assembly for deployment on a lunar surface having a pair of preselected lunar sites consisting of a first lunar site and a second lunar site is provided. A pair of interconnected vertical solar arrays consisting of a first vertical solar array positioned at the first lunar site to collect solar energy and a second vertical solar array positioned at the second lunar site to collect solar energy are provided. A cable transmits power between the first vertical solar array and the second vertical solar array, so that one of the vertical solar arrays can send collected energy to other vertical solar array, when the other vertical solar array is not collecting energy, to maintain the temperature of the other vertical solar array. A power storage device receives solar energy from the first vertical solar array and the second vertical solar array. A charging interface distributes energy to one or more lunar devices on the lunar surface. A landing vehicle has a payload thereon for carrying at least one of the pair of interconnected vertical solar arrays, the cable, the power storage device, and the charging interface.

MODES FOR CARRYING OUT THE INVENTION

Figure 1:
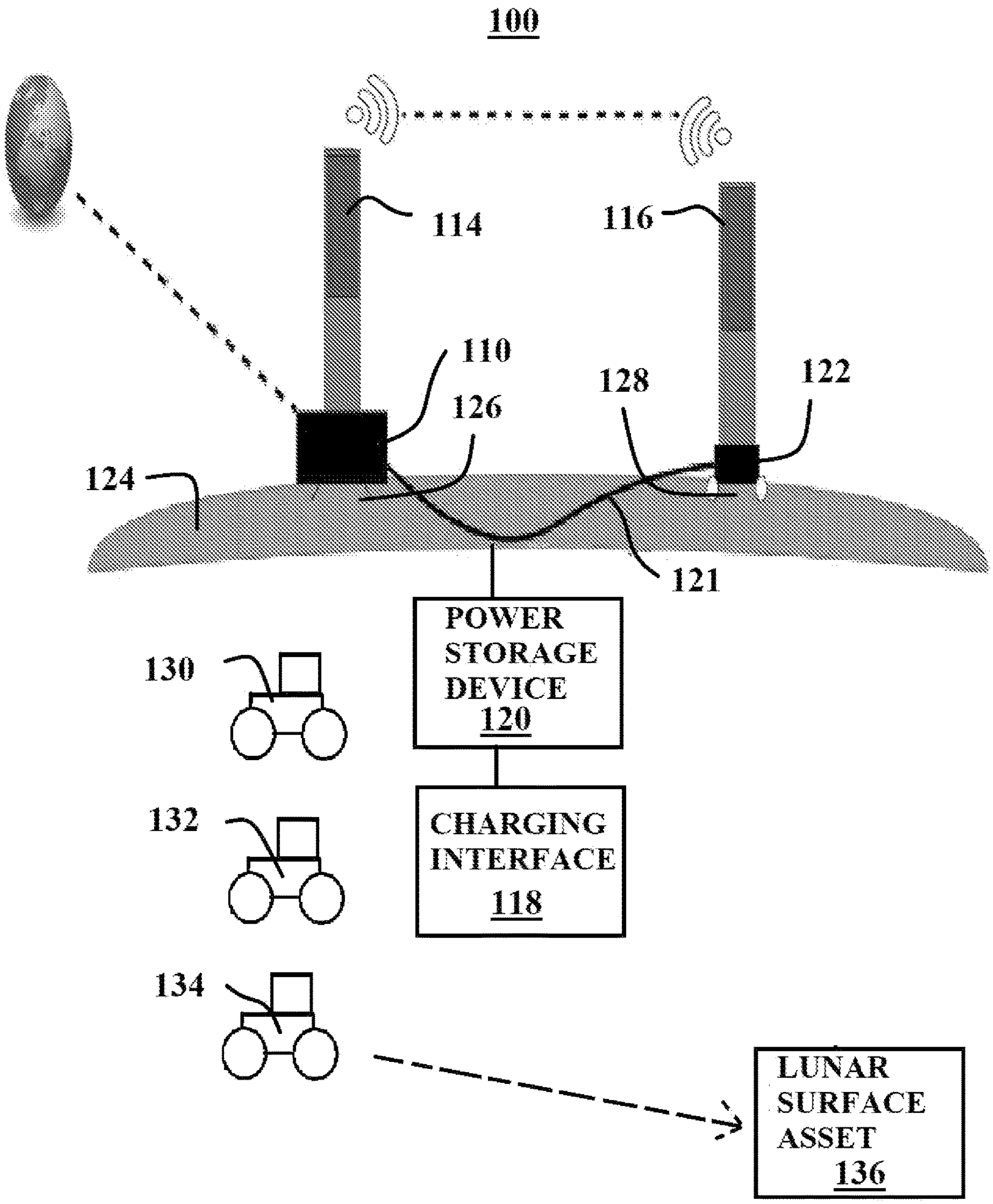
FIG. 1 is a schematic diagram of an embodiment of a lunar power grid in accordance with the disclosed subject matter.

The subject disclosure is directed to systems, methods, and apparatus for establishing a lunar power grid. The lunar power grid can be established with one or more landing vehicles that carry vertical solar arrays to two preselected lunar sites. A charging interface and a power storage device connect to the vertical solar arrays. The charging interface can function as charging ports for various devices, including tools, rovers and other vehicles, and other equipment.

In some embodiments, a single landing vehicle will carry all of the components of the lunar power grid to the lunar surface. In such embodiments, the landing vehicle will land on a first preselected lunar site to position one of the vertical solar arrays. The other vertical solar array can be mounted on a lunar vehicle that can transport the vertical solar array to a second preselected lunar site. The two vertical solar arrays can be interconnected.

In other embodiments, multiple landing vehicles will carry the components of the electric grid to the surface. One landing vehicle will carry the first vertical solar array to a first lunar site A second landing vehicle will carry the second vertical solar array to the second lunar site. A lunar vehicle, such as a rover, will transport at least one end of a cable from one of the lunar sites to the other lunar site to connect the two vertical solar arrays to one another.

The lunar power grid that is the subject of this disclosure can provide power for various structures, functions, and missions, such as human landing systems (HLS), lunar terrain vehicles (LTV), surface-based habitats, in-situ resource utilization (ISRU), commercial lunar payload services (CLPS), and Discovery class missions. The power grid can provide power for various devices, including scientific instruments, surface rovers, communication antennae, mining equipment, and other devices.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

The subject disclosure is directed to a system that integrates onto one or more launch vehicles that can be flown to the Moon. Upon activation, the system can power multi-year surface systems using abundant and affordable solar energy through the deployment of vertical solar arrays at two interconnected, strategically located positions on the Moon.

In operation, each vertical solar array takes a turn at generating solar power for distribution on the lunar surface. The vertical solar arrays also store power within batteries to stay warm and to survive during dark periods on the lunar surface. The system distributes power to any surface asset in the local area (on the scale of kilometers) through the use of tethered lunar rovers that are equipped with wireless and/or wired chargers that act as mobile charging outlets.

The system can be deployed at lunar sites that can have resource-rich deposits, or features of scientific or commercial interest. Further, lunar surface assets can be made more robust and affordable to operate for years at a time. Lunar missions can extend beyond the typical fourteen day duration, so that the system could become a critical infrastructure for the development of the Moon for several decades or more.

Figure 2:
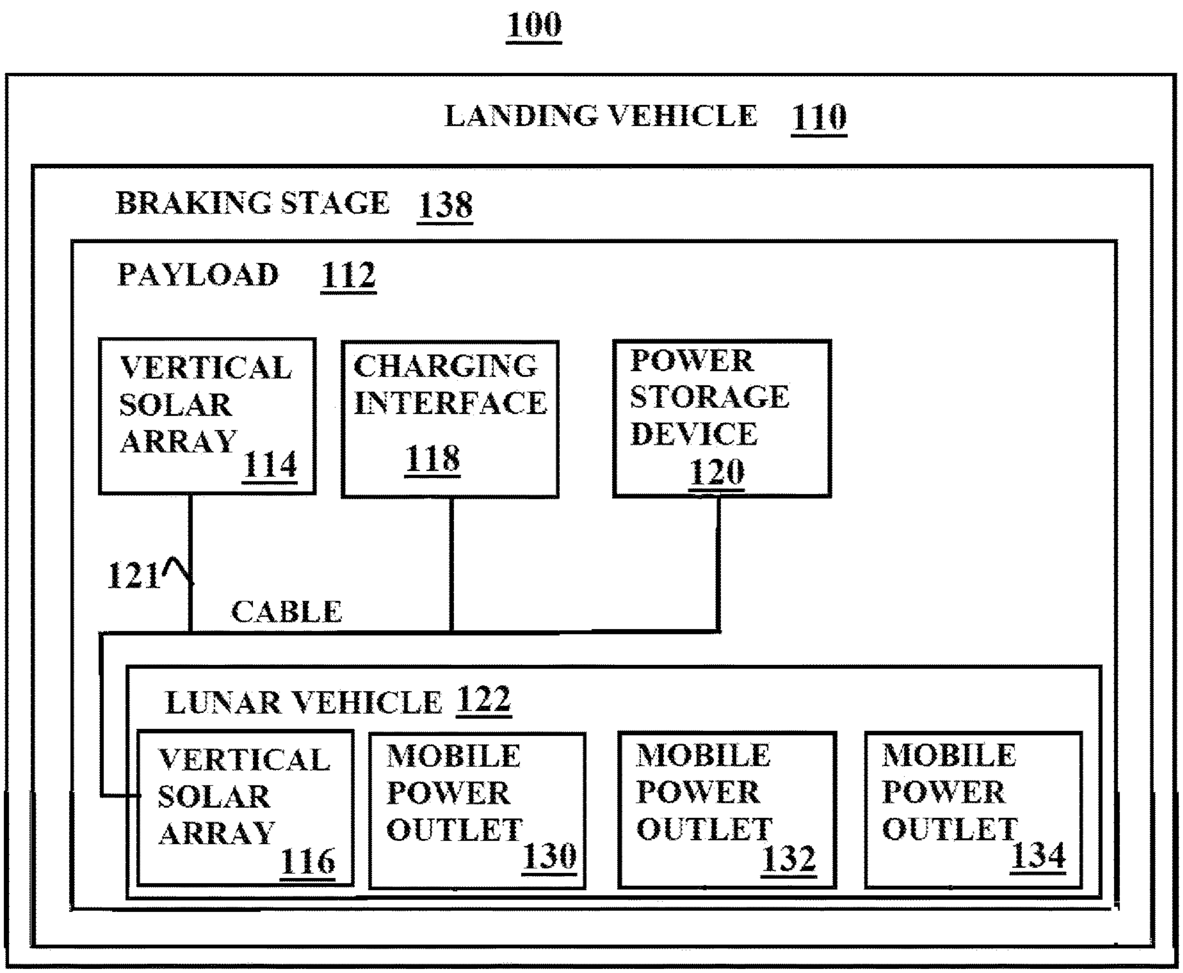
FIG. 2 is a block diagram of an embodiment of landing vehicle carrying the components of a lunar power grid assembly in accordance with the disclosed subject matter.
Figure 3:
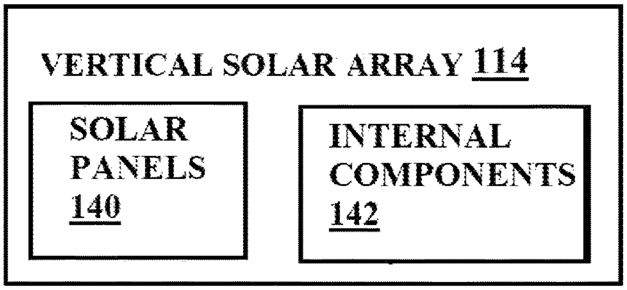
FIG. 3 is a block diagram of a vertical solar array in accordance with the disclosed subject matter.

Referring now to the drawings and, in particular, to FIGS. 1-3, there is shown a system, generally designated by the numeral 100, for assembling a lunar power grid. The system 100 can include a landing vehicle 110 having a payload 112 thereon. The payload 112 can include a pair of vertical solar arrays 114-116, a charging interface 118, and a power storage device 120. The vertical solar arrays 114-116, charging interface 118, and power storage device 120 are connected to one another with a cable 121 for transmitting power therebetween.

One of the vertical solar arrays 116 is mounted on a lunar vehicle 122 that can be an autonomous self-driving trailer, a wheeled frame, or a set of wheels mounted on the vertical solar array 116. The landing vehicle 110 lands on the lunar surface 124 at one of two preselected lunar sites 126-128 to deploy the system 100. The lunar vehicle 122 drives the vertical solar array 116 to the second lunar site 128. The lunar vehicle 122 can be tethered to the landing vehicle 110.

In some embodiments, the system 100 is incorporated into the lunar vehicle 122, which can be a single lander, such as the GRIFFIN™ launch vehicle by Astrobotic Technology, Inc. of Pittsburgh, Pennsylvania.

The lunar sites 126-128 are preselected by selecting sites that satisfy certain predetermined criteria. For example, in some embodiments, the lunar sites 126-128 should be less than about 4 kilometers between one another. In other embodiments, the lunar sites 126-128 should be less than about 2 kilometers from one another. In such embodiments, the lunar sites 126-128 should have slopes that are less than about ten degrees and should have shared illumination that exceeds 95% over 365 days.

Once deployed at the lunar sites 126-128, the vertical solar arrays 114-116 can collect energy for storage in the power storage device 120. The vertical solar arrays 114-116 can collect the energy in an alternating fashion, so that the vertical solar array 114 can collect energy when the vertical solar array 116 cannot and vice versa. Then, the vertical solar array 114 can send the energy (or a portion thereof) to the vertical solar array 116 to maintain the temperature of the vertical solar array 116 when it is not collecting energy.

Each of the vertical solar arrays 114-116 can include roll-out solar arrays that can follow or be turned away from azimuth while not in use. In some embodiments, the vertical solar arrays 114-116 can include solar cells that are offset about 10 meters from the lunar surface 124 with the lunar vehicle 122 being about 1 meter therefrom. The solar cells can be deployed at an angle of about ±5 degrees.

As shown in FIGS. 1-3, the system 100 can include one or more mobile charging outlets 130-134 that can connect to the charging interface 118. The mobile charging outlets 130-134 can connect to the charging interface 118 to receive power from the power storage device 120. Then, the mobile charging outlets 130-134 can disengage from the charging interface 118 and can travel to various lunar surface assets 136 by moving across the lunar surface 124.

In some embodiments, the landing vehicle 110 can carry the mobile charging outlets 130-134 with the other components of the system 100. The landing vehicle 110 can be equipped with a braking stage 138 to carry the payload 112.

The mobile charging outlets 130-134 can be stored on the lunar vehicle 122 on the landing vehicle 110. In some embodiments, the lunar vehicle 122 can be a Lunar Infrastructure Trailer (LIT), which is a self-driving wheeled vehicles that hosts the vertical solar arrays 114-116, batteries, and wire reels to connect back to the landing vehicle 110, as well as the mobile charging outlets 130-134 mounted with wireless chargers. The vertical solar array 116 can be supported with an inertial measurement unit and a gymbal to control movement. In such embodiments, the LIT can be configured to communicate at a data rate of 2.4 GHz WiFi on LIT. The vertical solar arrays 114-115 can be configured to communicate at a rate of 900 MHz.

The LITs can be sized to fit on the landing vehicle 110 and are deployable off of the landing vehicle 110 without ramps or outside robotic assistance. In some embodiment, the LIT can be include wireless charger coils, wireless charger transmitters, a power management and distribution module (PMAD), s command and data handling (C&DH), RF communication, Altitude determination and control (ADC) and deployable mechanism actuation. The LIT can also include power converters and power interfaces.

The vertical solar arrays 114-116 can be vertical solar array technology generators and, in particular, Vertical Solar Array Technology (VSAT) generators. Each one of the vertical solar arrays 114-116 is affixed with a dust-tolerant wireless charging system that can transmit power at 85% efficiency to surface assets, such as the lunar surface assets 136.

The operation of the system 100 is enhanced by certain properties of the lunar sites 126-128, which are strategically located, paired sites on the lunar surface 124 that provide the vertical solar arrays 114-116 with the ability to generate power continuously for years at a time. As many as one-hundred strategically located, paired sites may exist on the lunar surface 124.

The charging interface 118 can be a wireless proximity charger and a self-aligning physical connector. When the charging interface 118 is a wireless charger, the charging interface 118 can achieve about 80% transmission efficiency and are insensitive to regolith dust coverage.

The mobile charging outlets 130-134 can be ultra-light, modular, and scalable commercial lunar rovers. In this exemplary embodiment, the lunar rovers can be CUBEROVER® robot transport vehicles by Astrobotic Technology, Inc. of Pittsburgh, Pennsylvania.

The mobile charging outlets 130-134 can be equipped with cable reel assemblies for lunar surface use that can be mounted within a payload bay. The cable reel assemblies can include a reel, guide, actuators, heater, and the cable itself.

The power storage device 120 can be any suitable power storage device or system that can include a battery. The power storage device 120 can include a power inverter that will produce 5 k VAC and/or a power regulator the will produce 120 VDC.

Referring to FIG. 3, the vertical solar array 114 can include one or more solar panels 140 and internal components 142. The internal components 142 can include one or more heaters that can receive power from the vertical solar array 116 shown in FIGS. 1-2 when the solar panels 140 are not collecting solar energy.

The internal components 142 can further include sensitive electronic devices or parts that can be heated by the energy collected by the vertical solar array 116. It should be understood that the vertical solar array 116 shown in FIGS. 1-2 is configured in a similar manner. The ability to use this mechanism to heat the internal components 142 provides for a system that can function with batteries of a reduced size.

Figure 4:
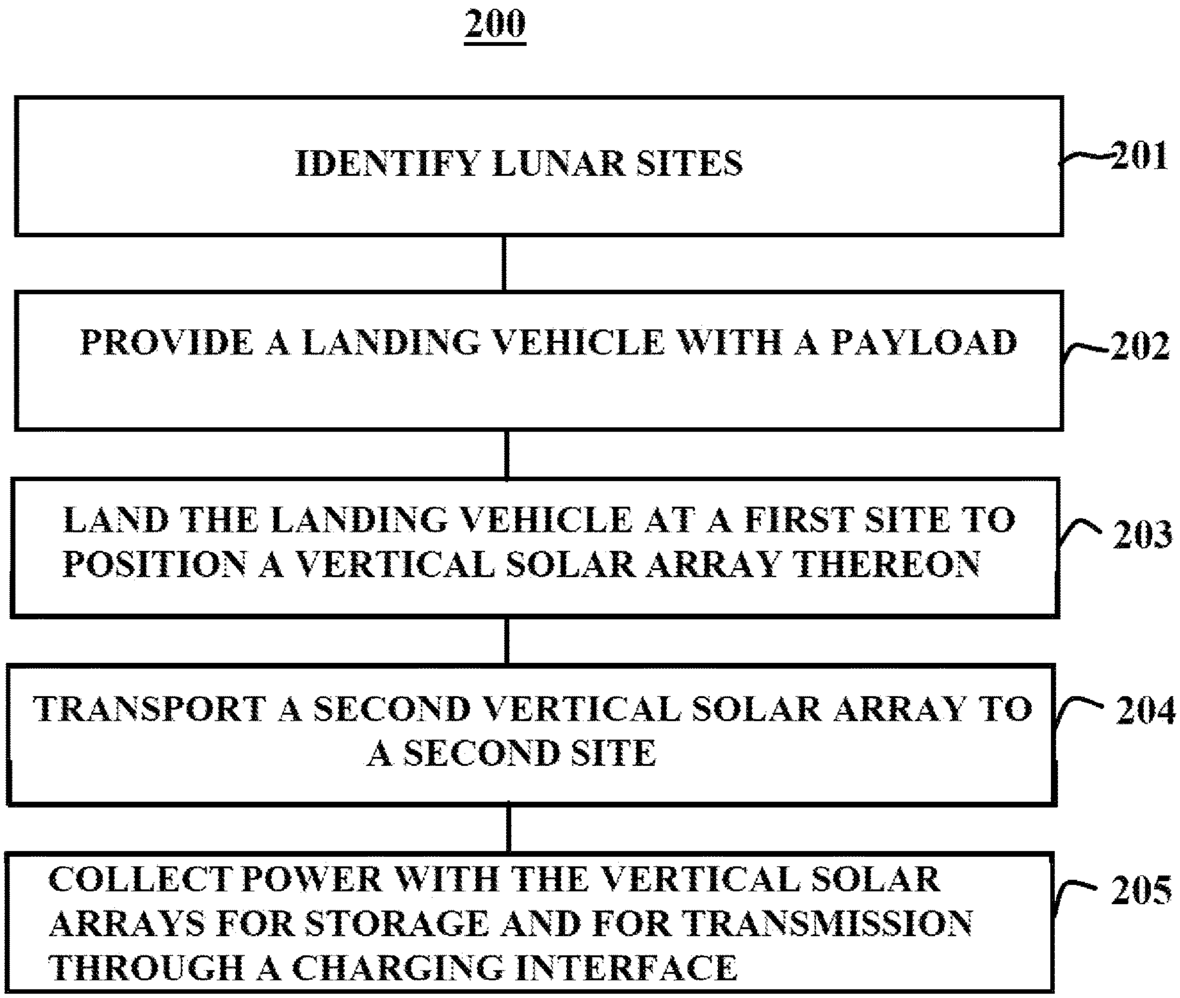
FIG. 4 is an exemplary process in accordance with the disclosed subject matter.

Referring now to FIG. 4, a process, generally designated with the numeral 200, for assembling a lunar power grid on a lunar surface is shown. The process 200 can be accomplished by using the system 100 of FIGS. 1-3.

At 201, a pair of preselected lunar sites consisting of a first lunar site and a second lunar site is identified. The identification of the lunar sites can be accomplished by a four-part sub process.

The first part of the sub-process includes utilizing LUNA-RAY™ software by Astrobotic Technology, Inc. of Pittsburgh, Pennsylvania to identify site pairs corresponding to lunar sites 126-128 shown in FIG. 1. The software includes a simulation tool that identifies candidate sites for vertical solar array deployment.

The software functions as a physically accurate planetary renderer and includes a suite of software tools for planning precision landings and rover traverse paths. The software uses topography and ephemeris data to produce photometrically accurate renderings of the lighting conditions on the lunar surface for any location and time. The function has advantages in polar missions, where long, sweeping shadows can cause the lighting conditions to change dramatically.

The software can generate ground station line-of-sight and Earth elevation maps for telecommunications planning. The software can incorporate real-time physics-based ray tracing and employs state-of-the-art photogrammetric methods to synthesize high-resolution digital elevation models (DEMs) from orbital images and light detection and ranging (LiDAR) data.

The second part includes determining illumination percentages for the sites through the analysis of datasets to determine the percentage of time that each pixel is illuminated vs. dark.

The third part include analyzing the datasets to calculate the maximum number of consecutive days where the pixel is illuminated. Areas with consecutive days of light are more attractive options for vertical solar array towers than ones that frequently dip in and out of light.

The fourth part includes determining the distance of each cable length by placing grids of each graph were placed at 2 km increments to account for the cable length between each deployed vertical solar array.

The identification sub-process focuses on finding two locations, wherein one of the two locations always had access to sunlight. This architecture allows one of the vertical solar arrays to always be powered, thus providing power to the whole grid.

To find two locations that shared illumination over the provided timeframe, locations with high illumination fractions were used as a starting point. Smaller sections of the full dataset were then cropped and used for local searches based upon the initial starting points or landing sites.

At 202, a landing vehicle that has a pair of interconnected vertical solar arrays consisting of a first vertical solar array and a second vertical solar array mounted on a lunar vehicle, a cable for transmitting power therebetween, a charging interface, and a power storage device is provided.

At 203, the landing vehicle is landed on the first lunar site to position the first vertical solar array thereon. The landing vehicle carries a static vertical solar array that will vertically deploy on the lander and one mobile vertical solar array mounted on a tethered, self-driving LIT. The LIT in turn carries one or more tethered lunar rover.

Upon landing, the LIT self-egresses from the landing vehicle and begins driving to the other site in the pair, but remains tethered by cable to the landing vehicle at Step 204. The cable is deployed from a reel on the vertical solar array itself as it drives to avoid dragging or snagging in the harsh lunar terrain. Once the LIT has egressed, the static vertical solar array on the landing vehicle deploys vertically and begins generating and storing power.

At 204, the second vertical solar array is transported to the second lunar site with the lunar vehicle. Once the LIT reaches its destination at the other site in the pair, the vertical solar array deploys and awaits its turn to generate and storing power. With both vertical solar arrays deployed and connected, the two systems take turns generating power keeping the other warm through the brief periods of low sunlight.

At 205, power is collected with the first vertical solar array and the second vertical solar array for storage in the power storage device and for transmission through the charging interface. The lunar rovers then self-egress from the LIT and begins driving to surface assets requiring power. As with the LIT, a cable is deployed from a reel on the CubeSat itself as it drives to avoid dragging or snagging on the lunar terrain. Upon reaching the asset, lunar rover begins delivering power via its wireless proximity charger, or, for especially high power assets, a self-aligning physical connector.

Figure 5:
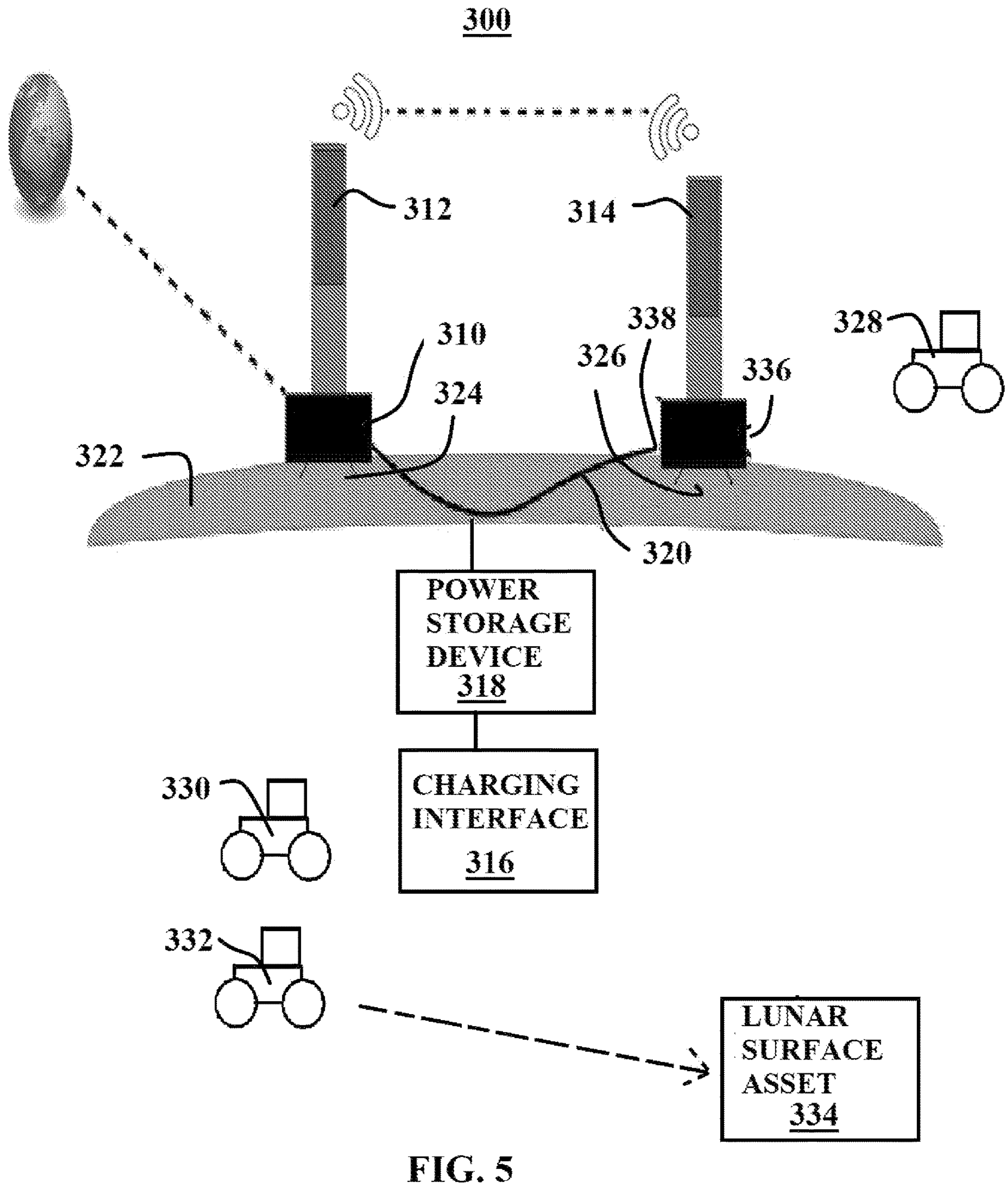
FIG. 5 is a schematic diagram of another embodiment of a lunar power grid in accordance with the disclosed subject matter.

Referring now to FIG. 5 with continuing reference to the foregoing figures, there is shown another embodiment of a system, generally designated by the numeral 300, for assembling a lunar power grid. Like the embodiment shown in FIGS. 1-3, the system 300 includes a landing vehicle 310, a pair of vertical solar arrays 312-314, a charging interface 316, and a power storage device 318. The vertical solar arrays 312-314, charging interface 316, and power storage device 318 are connected to one another with a cable 320 for transmitting power therebetween.

The landing vehicle 310 lands on the lunar surface 322 at one of two preselected lunar sites 324-326 to deploy the vertical solar array 312. The system 300 can include a plurality of mobile charging outlets 328-332 that can receive power from the charging interface 316 and drive to various other lunar sites, such as lunar asset 334.

Unlike the embodiment shown in FIGS. 1-3, the system 300 can include a second landing vehicle 336 for landing the vertical solar array 314 on the second one of the preselected lunar sites 324-326. In such embodiments, a lunar vehicle, such as mobile charging outlet 328 can transport one end of the cable 320 to the vertical solar array 314 to connect the vertical solar arrays 312-314 to one another.

It should be understood that while FIG. 5 depicts system 300 with two landing vehicles (i.e., landing vehicle 310 and landing vehicle 336), other systems are contemplated with three or more landing vehicles to carry the components of a lunar power grid thereon.

Figure 6:
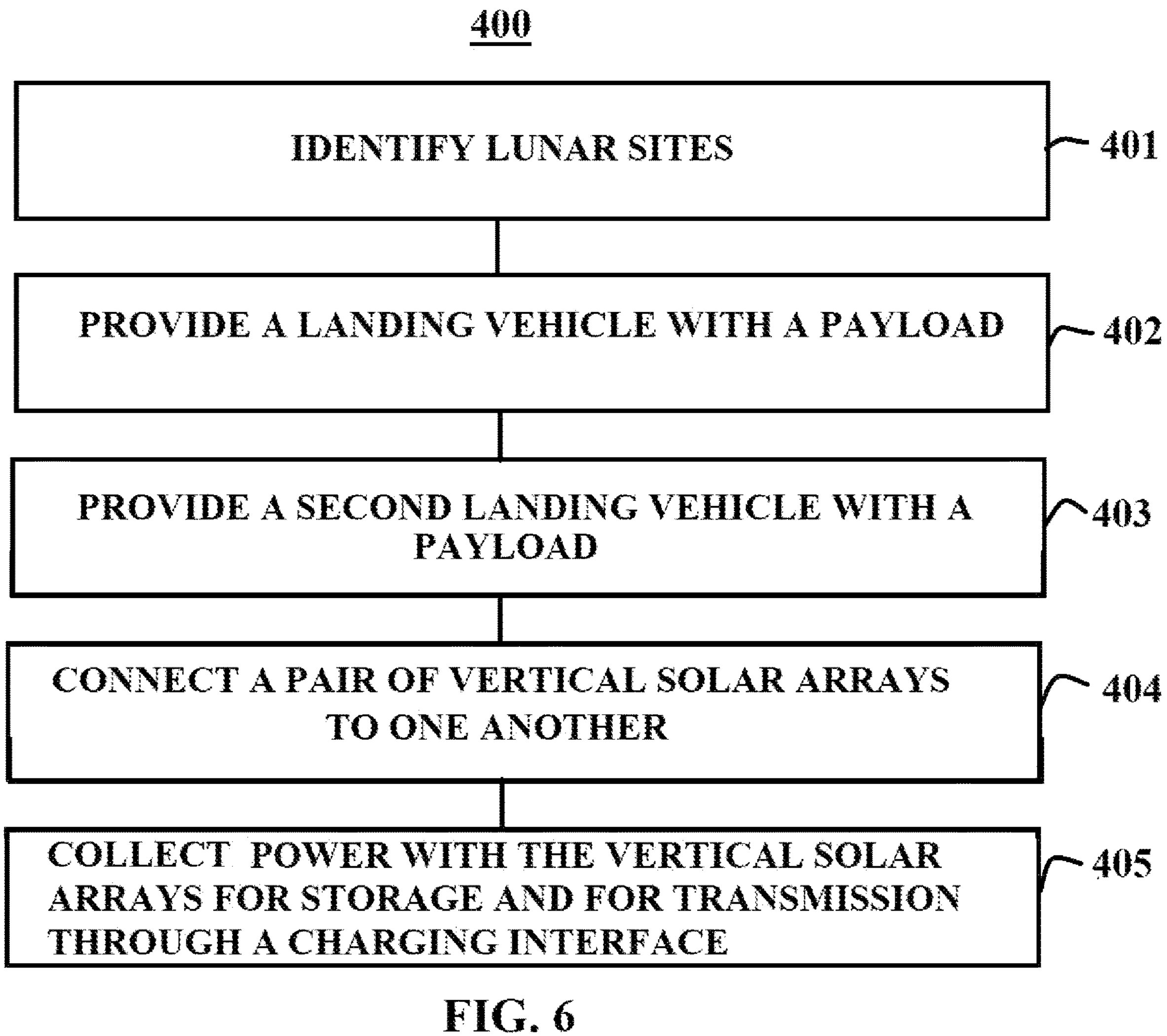
FIG. 6 is another exemplary process in accordance with the disclosed subject matter.

Referring now to FIG. 6, another process, generally designated with the numeral 400, for assembling a lunar power grid on a lunar surface is shown. The process 400 can be accomplished by using the system 300 of FIG. 5.

At 401, a pair of preselected lunar sites consisting of a first lunar site and a second lunar site is provided. In this exemplary embodiment, the lunar sites can be identified in the same manner as the sites were identified at Step 201 for the process 200 shown in FIG. 4 or through any other suitable technique or method.

At 402, a first landing vehicle having a first vertical solar array thereon lands at the first lunar site. In this exemplary embodiment, the landing vehicle can be the landing vehicle 310 shown in FIG. 5.

At 403, a second landing vehicle having a second vertical solar array thereon lands at the second lunar site. In this exemplary embodiment, the landing vehicle can be the landing vehicle 336 shown in FIG. 5.

At 404, a power storage device and a charging interface connects to the first vertical solar array and to the second vertical solar array with a cable. At 405, power is collected with the first vertical solar array and the second vertical solar array for storage in the power storage device and for transmission through the charging interface. In this exemplary embodiment, the vertical solar arrays, the charging interface, the power storage device, and the cable can be the vertical solar arrays 312-314, the charging interface 316, the power storage device 318, and the cable 320 shown in FIG. 5.

It should be understood that while the disclosed systems, methods, and apparatus are described within a system for assembling a lunar grid, the disclosed systems, methods, and apparatus could have applications on other celestial bodies or on the Earth.

Supported Features and Embodiments

Supported embodiments can provide various attendant and/or technical advantages in terms of a system that utilizes tethered vertical solar arrays positioned at strategic lunar site pairs that generate and store power at alternate times. The system operates by continuously generating and storing power. Further, continuous, uninterrupted power generation can be achieved on the lunar surface by replacing batteries over time.

The system is independent and self-contained. The system does not require support from the National Aeronautics and Space Administration (NASA) or from pre-landed surface assets to offload, to transport, or to set the components in place. The system is fully integrated with its own egress, mobility, cable deployment, and cable connection capabilities. The system can be delivered on a single launch and lunar landing in advance of any other mission activities.

The system is scalable to expand options. While the system can be integrated on a single launch vehicle and deployed with a single lunar lander, the system can be scaled with additional vertical solar array units across the lunar surface. Operations and power coverage can then be extended into new areas beyond the initial system deployment sites.

The system provides mobile power. Rather than statically generating power and leaving the distribution and connection accommodation requirements to lunar surface assets to figure out, the system distributes the power through the use of rovers. The rovers serve as mobile outlets that bring power to habitats, experiments, rovers, and other hardware through wired and wireless chargers.

The detailed description provided above in connection with the appended drawings is intended as a description of examples and is not intended to represent the only forms in which the present examples can be constructed or utilized. It is to be understood that the configurations and/or approaches described herein are exemplary in nature, and that the described embodiments, implementations and/or examples are not to be considered in a limiting sense, because numerous variations are possible.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A lunar power grid assembly for deployment on a lunar surface having a pair of preselected lunar sites consisting of a first lunar site and a second lunar site, the lunar power grid assembly comprising:

a pair of interconnected vertical solar arrays consisting of a first vertical solar array positioned at the first lunar site to collect solar energy and a second vertical solar array positioned at the second lunar site to collect solar energy;

means for transmitting power between the first vertical solar array and the second vertical solar array, so that one of the vertical solar arrays can send collected energy to other vertical solar array, when the other vertical solar array is not collecting energy, to maintain the temperature of the other vertical solar array;

a power storage device for receiving solar energy from the first vertical solar array and the second vertical solar array;

a charging interface for distributing energy to one or more lunar devices on the lunar surface; and a landing vehicle having a payload thereon for carrying at least one of the pair of interconnected vertical solar arrays, means for transmitting power between the first vertical solar array and the second vertical solar array, the power storage device, and the charging interface; and wherein the first vertical solar array and the second vertical solar array include means for sending power to one another over means for transmitting power between the first vertical solar array and the second vertical solar array.

2. The lunar power grid assembly of claim 1, wherein the payload includes the pair of interconnected vertical solar arrays, means for transmitting power between the first vertical solar array and the second vertical solar array, the power storage device, and the charging interface.

3. The lunar power grid assembly of claim 2, wherein the second vertical solar array is mounted on a lunar vehicle, wherein the landing vehicle can land on the first lunar site to position the first vertical solar array thereon, and wherein the lunar vehicle can transport the second vertical solar array to the second lunar site.

4. The lunar power grid assembly of claim 3, wherein the lunar vehicle is an autonomous self-driving trailer.

5. The lunar power grid assembly of claim 4, wherein the payload includes a plurality of mobile charging outlets.

6. The lunar power grid assembly of claim 5, wherein the plurality of mobile charging outlets are stored on the autonomous self-driving trailer before the landing vehicle lands on the first lunar site.

7. The lunar power grid assembly of claim 5, wherein each of the plurality of mobile charging outlets are lunar rovers.

8. The lunar power grid assembly of claim 3, wherein the lunar vehicle is tethered to the landing vehicle.

9. The lunar power grid assembly of claim 2, wherein the landing vehicle includes a braking stage.

10. The lunar power grid assembly of claim 1, further comprising at least one surface vehicle selected from the group consisting of a lunar vehicle, a mobile charging outlet, and rover;

wherein the landing vehicle is one of a pair of landing vehicles consisting of a first landing vehicle and a second landing vehicle with the first vertical solar array being carried on the first landing vehicle and the second vertical solar array being carried on the second landing vehicle;

wherein the first landing vehicle lands on the first lunar site to position the first vertical solar array thereon and the second landing vehicle lands on the second lunar site to position the second vertical solar array thereon; and wherein the surface vehicle can carry transport one end of means for transmitting power between the first vertical solar array and the second vertical solar array across the lunar surface from one of the vertical solar array to the other vertical solar array to connect the pair of vertical solar arrays to one another.

11. The lunar power grid assembly of claim 1, wherein the charging interface can provide power to lunar devices selected from the group consisting of mobile charging outlets, scientific instruments, tools, surface rovers, communication antenna, and mining equipment.

12. The lunar power grid assembly of claim 1, wherein the first lunar site and the second lunar site have landing surfaces that have slopes that are less than about ten degrees.

13. The lunar power grid assembly of claim 1, wherein the first lunar site and the second lunar site have shared illumination that exceeds 95% over 365 days.

14. The lunar power grid assembly of claim 1, wherein the power storage device is a battery.

* * * * *